United States Patent
Cunha et al.

(10) Patent No.: US 6,607,355 B2
(45) Date of Patent: Aug. 19, 2003

(54) TURBINE AIRFOIL WITH ENHANCED HEAT TRANSFER

(75) Inventors: Frank J. Cunha, Avon, CT (US); Young H. Chon, Manchester, CT (US); Bryan P. Dube, Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 37 days.

(21) Appl. No.: 09/973,222

(22) Filed: Oct. 9, 2001

(65) Prior Publication Data

US 2003/0068222 A1 Apr. 10, 2003

(51) Int. Cl.$^7$ ................................................ F01D 5/18
(52) U.S. Cl. ...................................................... 416/97 R
(58) Field of Search .............................. 416/96 A, 97 A; 415/115, 116, 177, 178

(56) References Cited

U.S. PATENT DOCUMENTS 5,468,125 A * 11/1995 Okpara et al. ............ 416/97 R
6,142,734 A * 11/2000 Lee ........................... 416/97 R

* cited by examiner

Primary Examiner—Edward K. Look
Assistant Examiner—Dwayne J. White
(74) Attorney, Agent, or Firm—Linda A. P. Cunha

(57) ABSTRACT

A turbine airfoil section having an internal cavity and a plurality of indentations on the inner surface of the internal cavity is described. The indentations provide enhanced heat transfer for cooling the internal cavity of an airfoil thereby improving the life of the airfoil and optimizing the efficiency of the engine by minimizing the amount of compressor bleed air required. Advantageously, this cooling scheme also does not restrict the cooling flow within the internal cavity. The indentations may have varying patterns and alternative geometric configurations.

21 Claims, 5 Drawing Sheets

FIG.5
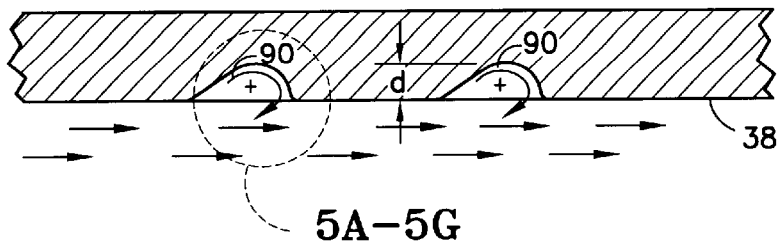
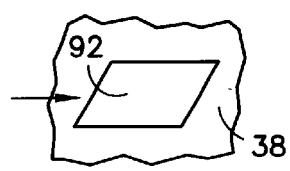
FIG.5A
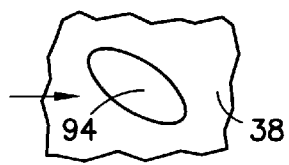
FIG.5B
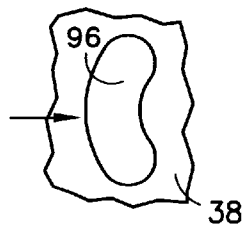
FIG.5C
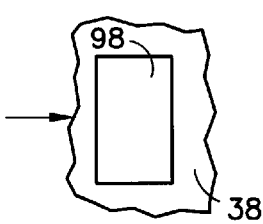
FIG.5D
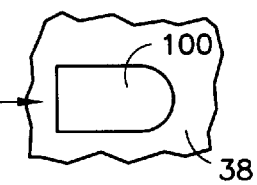
FIG.5E
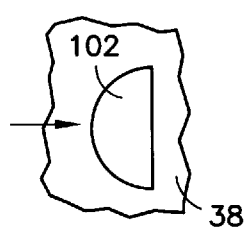
FIG.5F
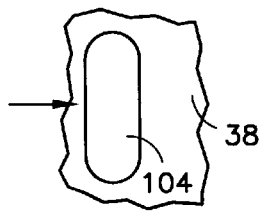
FIG.5G

TURBINE AIRFOIL WITH ENHANCED HEAT TRANSFER

TECHNICAL FIELD

This invention relates to coolable airfoils of the type used in high temperature rotary machines such as gas turbines and, more particularly, to an improved cooling scheme for airfoils with internal cooling passages with enhanced efficiency.

BACKGROUND OF THE INVENTION

The turbine of a gas turbine engine or machine is subjected to extremely high temperatures. The temperature of hot gases entering the turbine from the combustor is generally well above the melting point temperatures of the alloys from which turbine rotor blades and stator vanes are fabricated. Since both blades and vanes are subjected to such high temperatures, they must be cooled to maintain their structural integrity.

Generally, blades and vanes are cooled by air bled from the engine's compressor, bypassing the combustor. The cooling air then flows through internal cavities of the respective blades and vanes. The air temperature of the air bled from the compressor is generally at a relatively lower temperature than the temperature of the hot gases. It will be understood that compressor bleed air for such cooling will be unavailable to support combustion in the combustor. Thus, to minimize any sacrifice in engine performance due to inadequate airflow to support combustion, any scheme for cooling blades and vanes must optimize the utilization of compressor bleed cooling air. Airfoil cooling is accomplished by external film cooling and internal air impingement and convection cooling, or a combination of both.

In convection cooling, compressor bleed air flows through the internal cavities of the blades and vanes, continuously removing heat therefrom. Compressor bleed air enters the cavities through one or more inlets which discharges into the internal cavities. The internal cavities may include fins or ridges (also known as "trip strips") in a wall thereof, which facilitate improved convection cooling of the walls of the blades and vanes.

Film cooling has been shown to be very effective but requires a great deal of fluid flow. Also, the fabrication and machining of an airfoil with film cooling holes adds a degree of complexity that is costly.

It will also be appreciated that once the cooling air exits the internal cavity of the airfoil and mixes with the hot gases, a severe performance penalty is incurred due to the mixing process and the different temperature levels of the mixing flows. This undesirable effect is heightened if the cooling air is ejected from film holes located on the suction side of the airfoil generally in the trailing edge region as there are significant mixing losses due to the adverse pressure gradients that are formed in this region. If film cooling holes are placed beyond the throat area of the suction side wall, then undesirable flow separation is also possible. Thus, film cooling requires a greater amount of cooling air than with the possibility of inadequate cooling of the outer surfaces of the airfoil.

If film cooling holes are not employed, the airfoil can creep due to lack of cooling. If the airfoil is coated with a thermal barrier coating, for example, the coating can spall, leaving the metal exposed to the hot gases with the result being undesirable cracking or burning of the airfoil walls.

One of the traditional approaches to address the creep, is to increase the amount of heat transfer by using protruding ribs (trip strips, turbulators) in the internal passages of the blades and vanes to promote turbulent mixing in the bulk flow. However, in the trailing edge region, the internal cavities are relatively small thus making it difficult to add protruding ribs without causing flow blockage of the spent cooling flow within the internal cavity.

Impingement cooling is another cooling technique that may be employed to alleviate creep; however, it also has it drawbacks. With air impingement, compressor bleed air is channeled to the inside of an airfoil and directed onto the inside walls of the airfoil. The air then exits the airfoil through a set of film holes provided within the airfoil walls. However, if impingement cooling is employed in a region where it is not desirable to utilize film cooling, then the spent impingement air does not exit through proximate film cooling holes. This results in the reduction of the impingement cooling effectiveness as the cross flow from upstream impingement holes degrades the impingement action of the downstream impingement holes.

Therefore, there is a need in the art for an airfoil with an optimized cooling scheme which extends airfoil life and in turn, optimizes the efficiency of the engine and also reduces the amount of fuel burned by the engine, thus enhancing the economy of operation of the engine.

SUMMARY OF THE INVENTION

The above discussed and other drawbacks and deficiencies are overcome or alleviated by the present invention.

Accordingly, the present invention provides a turbine airfoil having enhanced heat transfer for cooling the internal cavity of an airfoil which optimizes the efficiency of the engine by minimizing the amount of compressor bleed air required.

The inner surface of the aft internal cavity, or any other cavity, of the airfoil is convectively cooled using a plurality of indentations positioned along the inner surface of the airfoil cavity. More particularly, the indentations may be located along the inner surface of the convex (suction) side wall of the airfoil proximate to the trailing edge. In this way, the present invention provides for the cooling of the inner surface of the airfoil cavities which extends the life of the airfoil without requiring a supply of additional cooling air, as would be the case if a film cooling scheme were employed. As a consequence, turbine efficiency is not adversely affected. Advantageously, this cooling scheme also does not block the spent impingement flow from flowing within the airfoil internal cavities. More particularly, the indentations when located in the aft internal cavity proximate to the trailing edge do not prevent the spent impingement flow from flowing out of the aft internal cavity and through the cooling slots of the trailing edge.

It is preferred that the indentations are staggered extending in the spanwise or longitudinal direction of the airfoil. It is most preferred that the indentations are arranged in a staggered array in at least two longitudinally extending rows such that the plurality of indentations are centered along a single zig-zag line. The pattern of longitudinal placement of the indentations could be parallel to the cooling air, perpendicular to such flow, or to any other angle to the cooling flow. Preferably, the pattern of the indentations would be optimized with respect to the direction of the local flow streamlines to provide the highest heat transfer surface enhancement possible.

Preferably, each indentation is a dimple that extends into the inner surface of the airfoil. However, the indentation could have alternative geometric configurations which can produce the same heat transfer enhancement in the trailing edge including all of the additional benefits that will are detailed herein. The indentations may have parallelepiped, elliptical, kidney, or rectangular shapes. Alternatively, the indentations may be ramps, semi-circular or race-track shapes. The selected indentation geometric configuration depends on the area and the desired heat transfer enhancement. Further, the indentations can also be of varying depth that is optimized in relation to the spacing between adjacent indentations.

The present invention also contemplates a method of enhancing the cooling of a turbine airfoil by forming a plurality of indentations on the inner surface of an internal cavity within the airfoil. This method can also be employed in an exiting airfoils to further enhance existing cooling schemes.

BRIEF DESCRIPTION OF THE DRAWINGS

The present invention will now be described, by way of example, with reference to the accompanying drawings in which:

FIG. 5 is an enlarged sectional view through a portion of the airfoil surface illustrated in FIG. 4 and taken along 5—5 of FIG. 4 including alternative geometric surface indentations in accordance with the present invention.

BEST MODE FOR CARRYING OUT THE INVENTION

Figure 1:
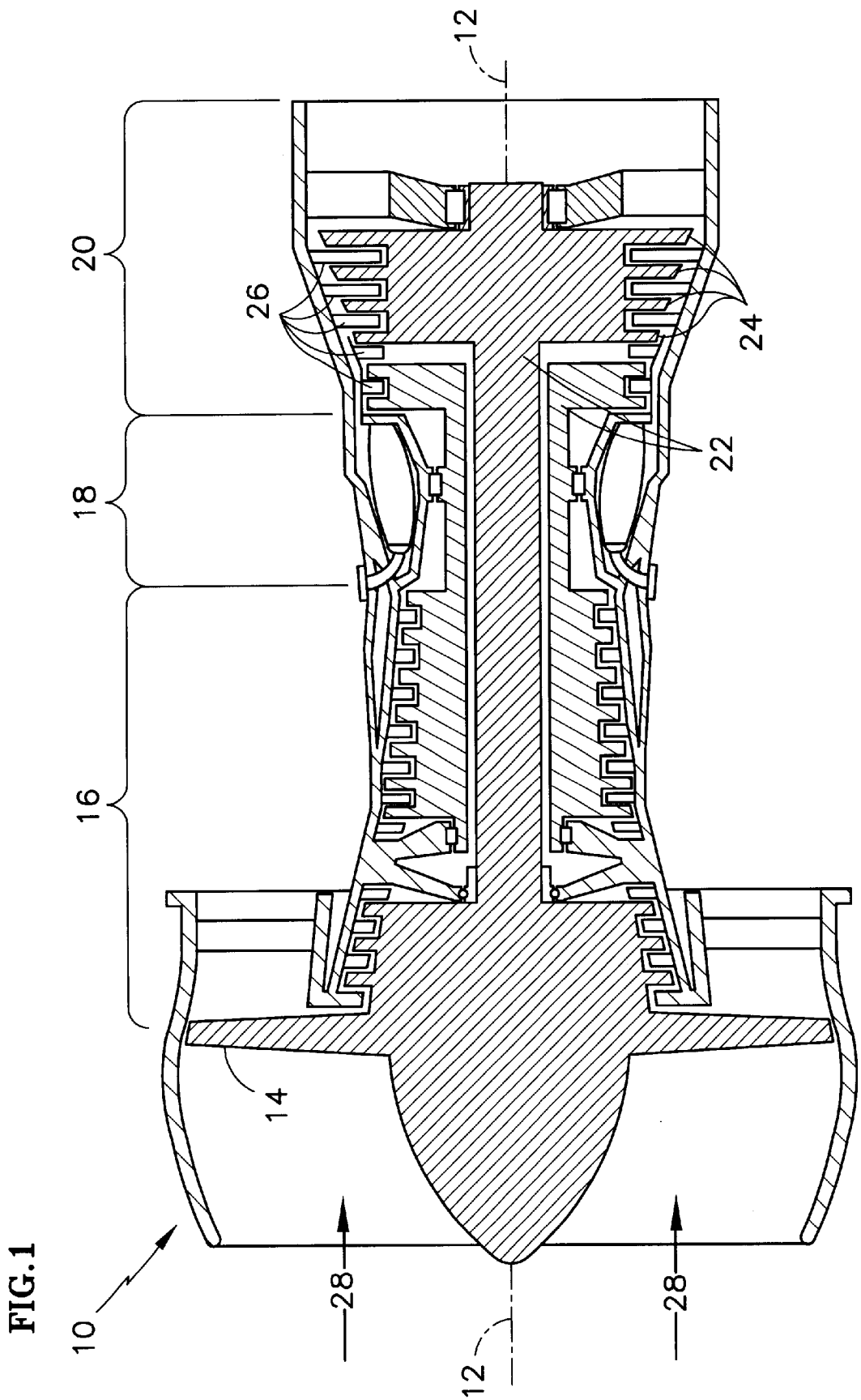
FIG. 1 is a simplified cross-sectional view of a gas turbine engine of the type employing the turbine airfoils of the present invention.

A gas turbine engine 10, such as a gas turbine used for power generation or propulsion, circumferentially disposed about an engine centerline, or axial centerline axis 12 is shown. The engine 10 includes a fan 14, a compressor 16, a combustion section 18 and a turbine 20. As is well known in the art, air compressed in the compressor 16 is mixed with fuel which is burned in the combustion section 18 and expanded in turbine 20. The air compressed in the compressor and the fuel mixture expanded in the turbine 20 can both be referred to as a hot gas stream flow 28. The turbine 20 includes rotors 22 which, in response to the expansion, rotate, driving the compressor 16 and fan 14. The turbine 20 comprises alternating rows of rotary airfoils or blades 24 and static airfoils or vanes 26. The use of the system of FIG. 1 is for illustrative purposes only and is not a limitation of the instant invention which may be employed on gas turbines used for electrical power generation and aircraft.

Figure 2:
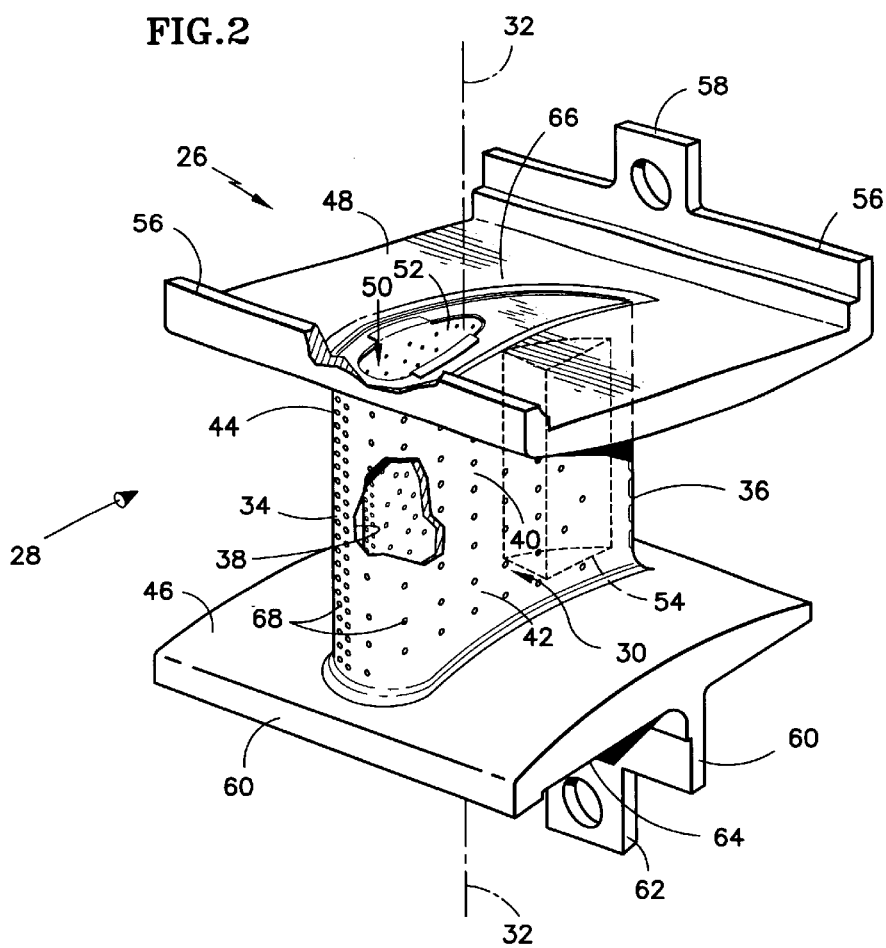
FIG. 2 is an enlarged perspective view of a turbine airfoil, and in particular, a turbine vane in combination with two platforms according to the present invention.
Figure 4:
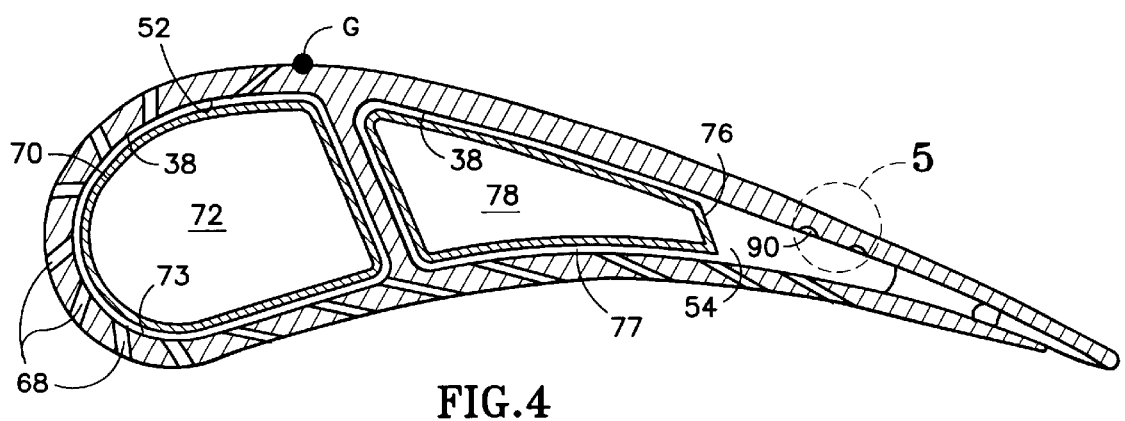
FIG. 4 is across sectional view of the airfoil of FIG. 2 taken along 4—4 of FIG. 3.
Figure 3:
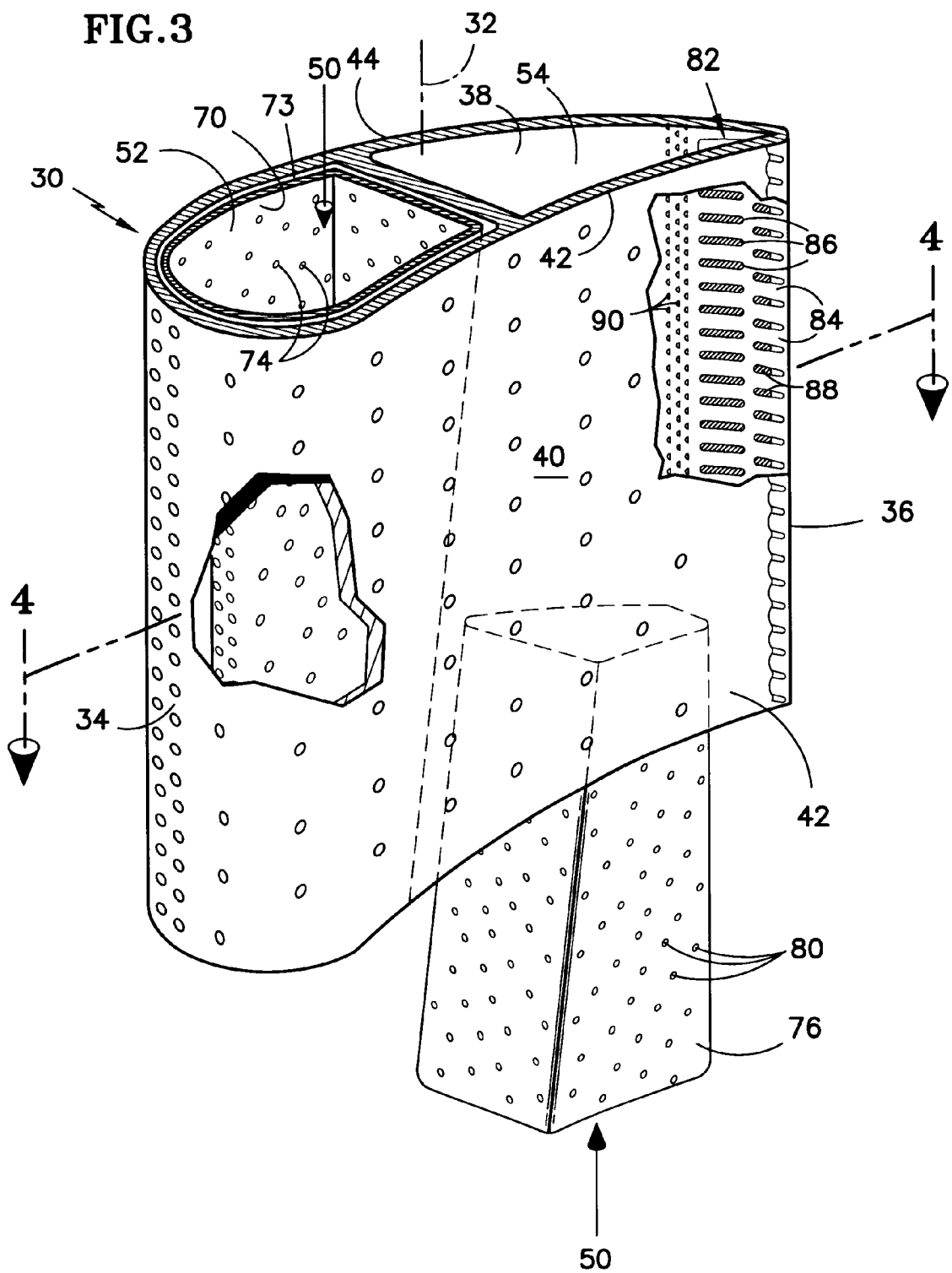
FIG. 3 is an enlarged perspective of the airfoil of FIG. 2 in combinations with two baffles.

Referring now to FIGS. 2 and 3, an isometric view of the vane 26 of FIG. 1 is shown. The vane 26 comprises an airfoil 30 with a longitudinal or span wise axis, 32, and having a leading edge 34 and a trailing edge 36. The airfoil 30 has an inner surface 38 and an opposing outer metal surface (outer surface) 40. The outer surface 40 is exposed to the hot gas stream flow 28 that enters the turbine 20 from the combustion section. The outer surface 40 of the airfoil 30 is shaped from the leading edge 34 to the trailing edge 36 so as to have a concave side wall or pressure side wall 42 and a convex side wall or suction side wall 44. Typically, the concave side wall 42 experiences a relatively high gas pressure as the hot gas stream flow 28 passes thereover and the convex side wall 44 experiences a relatively lower gas pressure as the hot gas stream flow 28 passes thereover. The convex and concave side walls 42, 44, respectively, are bounded by the trailing edge 36 and the leading edge 34. Between adjacent blades 24 and vanes 26 on a stage of the turbine 20, there is a minimum throat area that extends therebetween to pass the hot gas stream flow 28 for that particular stage. This minimum area corresponds to the gage point, G (FIG. 4). The preferred embodiment of the airfoil 30 also includes a forward internal cavity 52 and an aft internal cavity 54. The forward internal cavity 52 and the aft internal cavity 54 include a plurality of film air holes 68 (FIG. 4).

The airfoil 30 is bounded by an inner platform shown generally at 46 and an opposing outer platform, shown generally at 48. The inner and outer platforms 46, 48 create a gas path annulus that directs a source of pressurized cooling air (represented by arrow 50 in FIG. 3) into the forward and aft internal cavities 52, 54. The outer platform 48 includes opposing flanges 56 and a rail 58. Likewise, inner platform 46 includes opposing flanges 60 and a rail 62. The rails 58, 62 secure the vanes 26 to the case (not shown) of the turbine 20. In this way, the flanges 60 of the inner platform 46, in part, form a plenum 64 that supplies a portion of the pressurized cooling air 50 to the aft internal cavity 54 from the compressor 16. Similarly, the flanges 56 of the outer platform 48, in part, form a plenum 66 that supplies a portion of the pressurized cooling air 50 to the forward internal cavity 52 also from the compressor 16.

Positioned within the forward internal cavity 52 is a forward baffle (insert) 70 that has substantially the same contour as the forward internal cavity 52. The forward baffle 70 once inserted is secured to the adjacent inner surface 38 of the vane 26 via a weld or other similar means for attachment. Once secured, there is a gap 73 (FIG. 4) that is formed by the forward baffle 70 and the adjacent inner surface 38 of the forward internal cavity 52 such that the gap 73 is closed off from the pressurized cooling air 50 that enters the forward baffle 70. The forward baffle 70 thus defines an internal plenum 72 (FIG. 4) and includes a plurality of connecting holes or impingement holes 74. In this way, the pressurized cooling air 50 from the plenum 64 enters the cooling passage 72, flows through the impingement holes 74 into the gap 77 (FIG. 4) and impinges onto the adjacent inner surface 38 of the airfoil 30 thereby cooling the inner surface 38 of the vane 26. The cooling passage 72 is thus pressurized and the pressurized cooling air 50 flows out of the plurality of film air holes 68 to create an air film on the outer surface 40 of the vane 26 thereby cooling the outer surface 40 of the vane 26.

Positioned within the aft internal cavity 54 is an aft baffle (insert) 76 that has substantially the same contour as the aft internal cavity 54. The aft baffle 76 once inserted is secured to the adjacent inner surface 38 of the vane 26 via a weld or other similar means for attachment. Once secured, there is a gap 77 that is formed by the aft baffle 76 and the adjacent inner surface 38 of the aft internal cavity 54 such that the gap 77 is closed off from the pressurized cooling air 50 that enters the interior of the aft baffle 76. The aft baffle 76 thus defines an internal plenum 78 (FIG. 4) and includes a plurality of connecting holes or impingement holes 80. In this way, the pressurized cooling air 50 from the plenum 66 enters the internal plenum 78, flows through the impingement holes 80 into the gap 77 and impinges onto the adjacent inner surface 38 of the airfoil 30 thereby cooling the inner surface 38 of the vane 26. The internal plenum 78 is thus pressurized. A portion of the pressurized cooling air 50 flows out of the plurality of film air holes 68 located on the concave side wall 42 of the aft internal cavity 54 to create an air film on the outer surface 40 of the vane 26 thereby cooling the outer surface 40 of the vane 26.

Further, in addition to the film cooling of the aft internal cavity 54 as explained above, the trailing edge 36 is also additionally cooled as will now be detailed. The trailing edge 36 also has incorporated therein means for discharging a portion of the pressurized cooling air 50 for film cooling said trailing edge 36 where the means for discharging a portion of the pressurized cooling air 50 is in flow communication with the aft internal cavity 54. Preferably, the means for discharging a portion of the pressurized cooling air 50 is a plurality of cooling slots 84 that extend in the longitudinal or spanwise direction from the concave side wall 42.

Located within the aft internal cavity 54 along the inner surface 38 of the convex side wall 44 proximate to the aft baffle 76 are protrusions or guides 82 that extend outward from the inner surface 38 of the convex side wall 44 to the inner surface 38 of the concave side wall 42 terminating in the plurality of cooling slots 84. The protrusions 82 are employed to guide the impingement flow that exits the impingement holes of the aft baffle 76 to the cooling slots 84 located in the trailing edge 36. In this way, the spent impingement flow exits the aft internal cavity 54 via the cooling slots 84 thus creating an air film to cool the trailing edge 36. Preferably, the protrusions 82 include a plurality of guide or turning vanes 86 that are aligned with a plurality of tear drop shaped protrusions 88. The tear drop shaped protrusions 88 are adjacent and aligned with the cooling slots 84 such that the apex of the tear drop protrusions 88 are on opposing sides of the cooling slots 84 as shown in FIG. 3.

Referring now specifically to FIG. 4, a cross sectional view of the vane 26 of FIG. 2 is shown. The inner surface 38 of the aft internal cavity 54 as described hereinabove is cooled with impingement cooling. The inner surface 38 of the aft internal cavity 54 is also cooled using a plurality of indentations 90 having a continuous edge around the perimeter, for example discrete dimples having a concave recess. These indentations 90 further enhance the coolant heat pick-up of the airfoil 30. This provides enhanced heat transfer. Within the recess of the indentations 90, a recirculation zone is created as the spent impingement flow flows over each indentation 90. This is best seen in FIG. 5. The recirculation zone induces localized convective heat transfer along that portion of the inner surface 38 thus cooling the inner surface 38. This "vortex shedding" promotes mixing and thus enhances convective heat transfer along the inner surface 38. It is preferred that the indentations 90 are staggered extending in the spanwise or longitudinal direction 32 of the airfoil 30. It is most preferred that the indentations 90 are arranged in a staggered array in at least two longitudinally extending rows such that the plurality of indentations 90 are centered along a single zig-zag line. The pattern of longitudinal placement of the indentations 90 could be parallel to the cooling air, perpendicular to such flow, or to any other angle to the cooling flow. Preferably, the pattern of the indentations 90 would be optimized with respect to the direction of the local flow streamlines to provide the highest heat transfer surface enhancement possible.

Preferably, the indentations 90 are located along the inner surface 38 of the aft internal cavity 54 where there are space constraints. In this way, enhanced heat transfer is achieved without blocking or restricting the spent impingement air flow emitted from the aft baffle 76. Most preferably, the indentations 90 are positioned on the inner surface 38 of the convex side wall 44 of the aft internal cavity 54, proximate to the protrusions 82 and beyond the gage point, to alleviate the heating that occurs in the trailing edge 36 and more specifically, along the convex side wall 44 of the airfoil 30.

There are further advantages to the placement of the indentations 90 on the inner surface 38 of the convex side wall 44 adjacent the trailing edge 36. It is generally understood that in the area proximate to the outer surface 40 of the airfoil 30 on the convex side wall 44, there is an adverse pressure gradient caused by the decelerating flow field that causes large mixing losses. These mixing losses result in a highly unstable region that negatively impacts turbine 20 efficiency. Therefore, the present invention provides for the cooling of the inner surface of the airfoil cavities which extends the life of the airfoil without requiring additional cooling air, as would be the case with a film cooling scheme. As a consequence, turbine efficiency is not adversely affected. Advantageously, this cooling scheme also does not block the spent impingement flow from flowing within the aft internal cavity 54. More particularly, the indentations 90 when located in the aft internal cavity 54 proximate to the trailing edge 36 do not prevent the spent impingement flow from flowing out of the aft internal cavity 54 and through the cooling slots 84.

Referring now to FIG. 5, an enlarged sectional view through a portion of the airfoil 30 surface illustrated in FIG. 4 and taken along 5—5 is shown including alternative geometric shapes (FIGS. 5A–5G) that are suitable for the indentations 90 and in accordance with the present invention. Preferably, each indentation 90 is a dimple that extends into the inner surface 38 of the airfoil 30. However, the indentation 90 could have alternative geometric configurations which can produce the same heat transfer enhancement in the trailing edge 36 including all of the additional benefits that will are detailed herein. Exemplary geometric configurations for the indentations 90 are illustrated in FIG. 5. Specifically, the indentations 90 could have parallelepiped 92, elliptical 94, kidney 96, or rectangular 98 shapes. Alternatively, the indentations 90 could be ramps 100, semi-circular 102 or race-track 104 shapes. All of the shapes 90, 92, 94, 96, 98, 100, 102, 104 increase the inner surface area of the concave or convex side walls 42, 44 thereby increasing the heat pick-up by the spent impingement flow.

The selected geometric configurations of the indentations 90 depend on the area and the desired heat transfer enhancement. Further, the indentations 90 can also be of varying depth, d. The depth, d, of the indentations 90 is related to the preferred spacing between adjacent indentations 90. It is preferred that the distance between the centers, C, of each indentation 90 is separated from each adjacent indentation by a length, L, equal to approximately about six times the depth, d.

It is also understood by those skilled in the art and within the scope of this invention that there could be a combination of indentations 90 with different sizes and shapes employed in the airfoil 30 or airfoils belonging to a specified stage of the turbine 20. Also, the selection of the geometric configuration or shape and size of the indentations 90 is preferably optimized with respect to the direction of the local flow streamlines to provide the highest heat transfer surface enhancement possible. It is understood that it is generally straightforward to determine the direction of the flow streamlines for a given airfoil 30.

Figure 6:
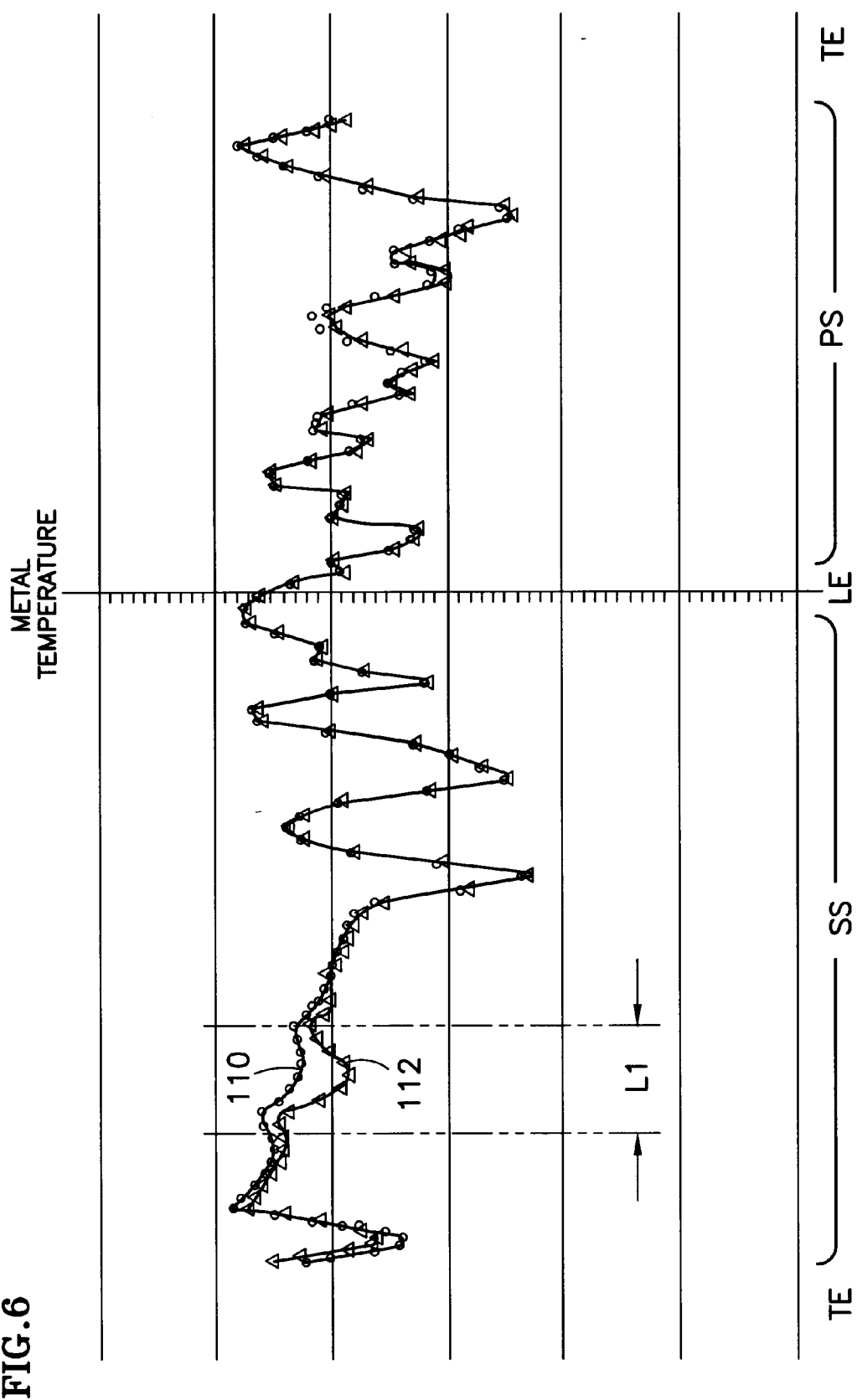
FIG. 6 is a plot of the relative temperature profile along the outer metal surface 40 of the airfoil taken at the mid chord section for the cooled airfoil with indentations positioned on the convex side wall proximate the trailing edge and the cooled airfoil without the indentations.

The benefits of the present invention illustrated and described herein are further understood in connection with FIG. 6. FIG. 6 is a plot of the relative temperature profile along the outer metal surface 40 of the airfoil 30 taken at the mid chord section for the cooled airfoil with indentations positioned on the convex side wall proximate the trailing edge and the cooled airfoil without the indentations. The notations in FIG. 6 are as follow: TE is for trailing edge 36; LE is for leading edge 34; PS is for pressure side wall and SS is for suction side wall.

Curve 110 illustrates the relative temperature profile without the indentations 90 while curve 112 illustrates the relative temperature profile with the indentations 90. Length, L1, indicates the preferred region, near the trailing edge 36 and on the convex side wall 44, where the indentations 90 are employed. Referring to curve 112, it can be seen that the indentations 90 of the present invention positioned in the trailing edge 36 reduces the relative temperature of the outer surface 40 of the airfoil 30 thus cooling the inner surface 38 of the aft internal cavity 54 near the trailing edge 36. This reduction in temperature is indicative of an enhanced trailing edge 36 cooling scheme which requires significantly less compressor bleed air than if the indentations 90 are not employed, namely curve 112.

Finally, the present invention advantageously employs an optimized cooling scheme, namely the use of indentations 90, that enhances airfoil 30 cooling without requiring additional amounts of compressor bleed. Thus, turbine efficiency is not compromised and neither is the operating cost of the engine (propulsion) or machine (land based electrical power production). This becomes increasingly important as modern gas turbines, used for propulsion and electrical power production, provide increases in thrust and power output, respectively, requiring even greater quantities of air to support combustion thus making cooling air for airfoils unavailable with any measure of efficiency. Yet another advantage of the present invention is that the use of indentations 90 are concentrated towards the tailing edge the effectiveness of baffle impingement cooling is least effective due to the cross flow degradation of the spent impingement flow. Thus, enhanced cooling is provided in the trailing edge 36 of the airfoil 30 without restricting the spent impingement flow from exiting through the trailing edge 36 cooling slots 84. Further, it is understood by those skilled in the art and within the scope of this invention, that the enhanced airfoil cooling due to the indentations 90 works well with impingement cooling near the trailing edge 36 as well as with film cooling holes that may exist in the convex side wall 44 near the trailing edge 36 as may be found in existing airfoils.

It is further contemplated that the present invention may be easily employed in an existing airfoil 30 that employs both impingement and film cooling holes. If, for example, the existing airfoil 30 has a series of film cooling holes, the use of this invention would further enhance heat transfer while reducing the necessary amount of film cooling required to cool the airfoil 30. If, for example, the existing airfoil 30 does not employ film cooling holes, then the use of this invention provides the existing airfoil 30 with a means for enhanced convection cooling with no engine performance degradation.

As described above, the present invention can be implemented and utilized in connection with many alternative airfoil configurations. While the coolable airfoil 30 of the present invention has been described within the context of a turbine vane 26, it would be appreciated that the invention may be employed with equal utility in a rotating turbine blade 24. In addition, the present invention can be utilized in turbine airfoils of turbine generators as well as turbine engines, e.g., in aircraft and marine applications, or the like.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out the invention, but that the invention will include all embodiments falling within the scope of the appended claims.

We claim:

1. An airfoil comprising:
   a leading edge, a trailing edge, a pressure side wall and a suction side wall, said pressure side wall connected to said suction side well at said leading edge and said trailing edge and spaced apart from each other therebetween to define a cavity extending longitudinally between a root and a tip of said airfoil into which cooling air is flowable from an end of said cavity, said cavity having an inner surface; and
   a plurality of discrete dimples in said inner surface.

2. The airfoil of claim 1 wherein said dimples are disposed proximate to said leading edge.

3. The airfoil of claim 1 wherein said dimples are arranged in a staggered array in at least two longitudinally extending rows such that said plurality of dimples are centered along a single zig-zag line.

4. The airfoil of claim 1 wherein each of said dimples comprises a concave recess on said inner surface.

5. The airfoil of claim 1, wherein said dimples are of a shape selected from the group consisting of parallelepiped, elliptical, kidney, rectangular, ramp, semi-circular and racetrack.

6. The airfoil of claim 1, wherein said dimples have a depth and the spacing between adjacent of said dimples is equal to about six times said depth.

7. The airfoil of claim 1 wherein said dimples are disposed on said inner surface of said suction side wall.

8. The airfoil of claim 7 wherein said dimples are disposed proximate to said trailing edge.

9. The airfoil of claim 8 wherein said leading edge has incorporated therein means for discharging a portion of said cooling air for film cooling said trailing edge, said means for discharging a portion of said cooling air in flow communication with said cavity.

10. The airfoil of claim 9 wherein said air distribution means is a plurality of film cooling leading edge holes extending through said leading edge.

11. The airfoil if claim 10 wherein said baffle defines a plenum, said plenum receives said cooling air and said perforations are impingement holes for directing in corresponding jets said cooling air received in said plenum against said inner surface.

12. The airfoil of claim 8 further including:
   a baffle, said baffle being disposed within the cavity and having a plurality of perforations therein, said baffle configured to cool the inner surface of the cavity.

13. The airfoil of claim 12 further including:
a plurality of protrusions longitudinally disposed in said cavity proximate to said trailing edge, said protrusions project into said cavity from said suction side wall to said pressure side wall; and
a plurality of trailing edge slots extending from said trailing edge along said pressure side wall wherein said protrusions are positioned between said dimples and said trailing edge slots.

14. The airfoil of claim 1 wherein said dimples are disposed on said inner surface of said pressure side wall.

15. The airfoil of claim 14 wherein said dimples are disposed proximate to said trailing edge.

16. A method of enhancing heat transfer of an airfoil comprising;
providing said airfoil having a leading edge, a trailing edge, a pressure side wall and a suction side wall, said pressure side wall connected to said suction side wall at said leading edge and said trailing edge and spaced apart from each other therebetween to define a cavity extending longitudinally between a root and a tip of said airfoil into which cooling air is flowable from an end of said cavity, said cavity having an inner surface; and
forming a plurality of discrete dimples in said inner surface.

17. The method of claim 16 wherein said dimples are disposed on said inner surface of said pressure side wall and said plurality of dimples are disposed proximate to said trailing edge.

18. The method of claim 16 wherein said dimples are arranged in a staggered array in at least two longitudinally extending rows such that said plurality of dimples are centered along a single zig-zag line.

19. The method of claim 16 wherein said leading edge has incorporated therein a plurality of film cooling extending through said leading edge, and disposed in flow communication with said cavity for discharging a portion of said cooling air for film cooling said trailing edge.

20. The method of claim 16 wherein said dimples are disposed on said inner surface of said suction side wall and said plurality of dimples are disposed proximate to said trailing edge.

21. The method of claim 20 further including:
a baffle, said baffle being disposed within the cavity and having a plurality of perforations therein, said baffle configured to cool the inner surface of the cavity.

* * * * *